(12) United States Patent
Gill et al.

(10) Patent No.: US 12,108,706 B2
(45) Date of Patent: Oct. 8, 2024

(54) SUGARCANE HARVESTER WITH BILLET-GUIDING SILL

(71) Applicant: DEERE & COMPANY, Moline, IL (US)

(72) Inventors: Harmandeep S. Gill, Baton Rouge, LA (US); Surfraj Fattepur, Bijapur (IN); Dusk S. Mixon, Saint Armant, LA (US); Todd J. Rodrigue, Thibodaux, LA (US); Guy E. Burch, Thibodaux, LA (US); Andreive G. Silva, Catalão (BR); Douglas J. Silva, Catalão (BR); Aureo F. Pasch, Catalão (BR)

(73) Assignee: DEERE & COMPANY, Moline, IL (US)

( * ) Notice: Subject to any disclaimer, the term of this patent is extended or adjusted under 35 U.S.C. 154(b) by 694 days.

(21) Appl. No.: 17/303,862

(22) Filed: Jun. 9, 2021

(65) Prior Publication Data

US 2022/0394929 A1   Dec. 15, 2022

(51) Int. Cl.
*A01D 45/10*   (2006.01)
*A01D 43/06*   (2006.01)
*A01D 43/08*   (2006.01)

(52) U.S. Cl.
CPC .............. *A01D 45/10* (2013.01); *A01D 43/06* (2013.01)

(58) Field of Classification Search
CPC ........ A01D 45/10; A01D 43/06; A01D 43/08; B65G 21/10; B65G 21/14; B65G 21/06; B65G 21/16; B65G 67/08; Y10T 83/4836
See application file for complete search history.

(56) References Cited

U.S. PATENT DOCUMENTS

| | | | |
|---|---|---|---|
| 4,019,308 A * | 4/1977 | Quick | A01D 45/10 56/60 |
| 4,039,434 A * | 8/1977 | Croucher | B07B 9/02 209/285 |
| 2015/0327437 A1* | 11/2015 | Mixon | A01D 45/10 241/235 |
| 2022/0217906 A1* | 7/2022 | Roberge | A01D 45/10 |

FOREIGN PATENT DOCUMENTS

WO    WO-2020237339 A1 * 12/2020 ............. A01D 43/08

OTHER PUBLICATIONS

Image of Sill Roller for Sugarcane Harvester (admitted prior art at least as of Apr. 23, 2021) (1 page).
Image of Sill Plate for Sugarcane Harvester (admitted prior art at least as of May 3, 2021) (2 pages).

\* cited by examiner

*Primary Examiner* — Thomas B Will
*Assistant Examiner* — Robert E Pezzuto

(57) ABSTRACT

A sugarcane harvester for harvesting sugarcane in a forward direction of travel comprises a chopper, a basket, and a sill. The chopper chops stalks of sugarcane into billets, and comprises a lower drum and an upper drum that counter-rotates relative to one another, each about a respective axis of rotation. The basket is positioned to receive a stream of billets discharged from the chopper. The sill is positioned between the chopper and the basket to guide billets discharged from the chopper toward the basket. A plate of the sill comprises a billet guide surface oriented to guide billets over the sill.

9 Claims, 4 Drawing Sheets

SUGARCANE HARVESTER WITH BILLET-GUIDING SILL

FIELD OF THE DISCLOSURE

The present disclosure relates to billet-type sugarcane harvesters.

BACKGROUND OF THE DISCLOSURE

Sugarcane harvesters often have a chopper and an elevator. The chopper chops stalks of sugarcane harvested by the sugarcane harvester into longitudinal segments called billets. The chopper discharges the billets into a basket where the billets are collected for conveyance by the elevator. The elevator lifts the billets to a higher elevation for discharge into a wagon for transport to a mill.

SUMMARY OF THE DISCLOSURE

According to an aspect of the present disclosure, a sugarcane harvester for harvesting sugarcane in a forward direction of travel comprises a chopper, a basket, and a sill. The chopper chops stalks of sugarcane into billets. The chopper comprises a lower drum and an upper drum that counter-rotate relative to one another. Each of the lower and upper drums is arranged to do so about a respective axis of rotation. The basket is positioned to receive a stream of billets discharged from the chopper. The sill is positioned between the chopper and the basket to guide billets discharged from the chopper toward the basket. The sill comprises a guide plate that comprises a billet guide surface oriented to guide billets over the sill. The billet guide surface defines an imaginary line extending forwardly through or below the axis of rotation of the lower drum.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
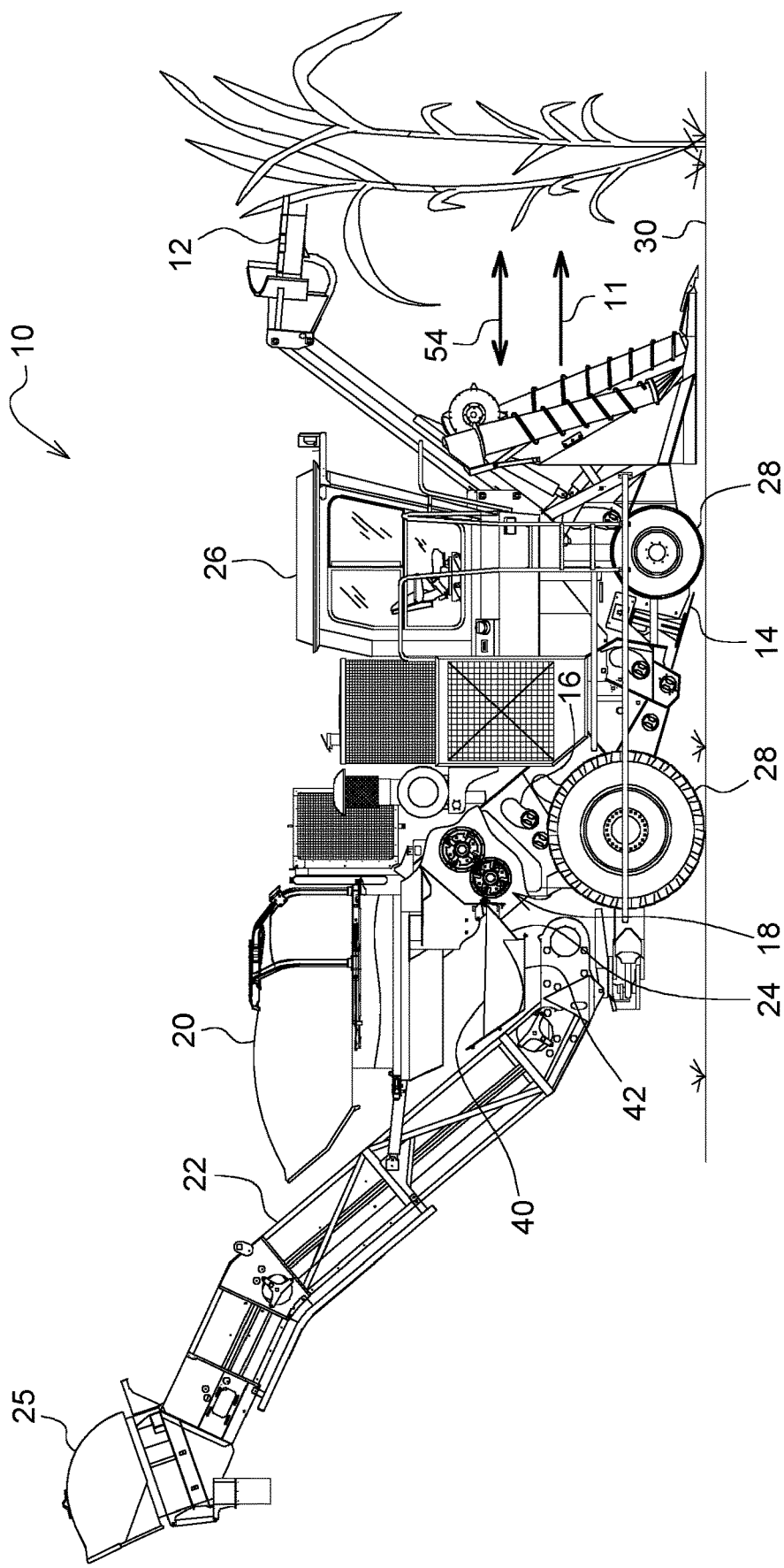
FIG. 1 is a side elevational view showing a sugarcane harvester with portions broken away to show a chopper of the sugarcane harvester.

Referring to FIG. 1, a sugarcane harvester 10 is configured to harvest sugarcane when moving in a forward direction of travel 11. The harvester 10 includes, for example, a topper 12, one or more basecutters 14 (only one basecutter shown), a feed section 16, a chopper 18, a primary extractor 20, an elevator 22, a basket 24, and a secondary extractor 25 (some harvesters may not include the secondary extractor 25). The topper 12 cuts leaves off the sugarcane plants before the plants are severed by the one or more basecutters 14. Each of the one or more basecutters 14 includes a left cutting disk and a right cutting disk (only a left cutting disk shown). The counter-rotating left and right cutting disks of each of the one or more basecutters 14 cooperate with one another to sever the stalks of sugarcane plants at a location near the ground. The feed section 16 receives a mat of severed sugarcane from each of the one or more basecutters 14 and feeds the one or more mats rearwardly. The chopper 18 receives the one or more mats from the feed section 16 and chops stalks of sugarcane into billets. The primary extractor 20 is positioned between the chopper 18 and the elevator 22 to separate leaves ingested into the harvester 10 from the billets discharged from the chopper 18 and removes the separated leaves from the harvester 10. The basket 24 receives the stream of billets discharged from the chopper and collects the billets for conveyance by the elevator 22. The elevator 22 is positioned at the rear of the harvester 10 and conveys the billets to an elevated position where the billets are discharged from the harvester 10 into a wagon to be hauled away. The secondary extractor 25, if included, is mounted to the upper discharge end of the elevator 22 to further separate remaining leaves from the billets.

The harvester 10 includes an operator's station 26 and traction elements 28. A human operator can operate the harvester 10 from the operator's station 26. The traction elements 28 are positioned on the left and right sides of the harvester 10 for engaging the ground 30 and propelling the harvester 10. Each traction element 28 may be, for example, a ground-engaging wheel or a track unit.

Figure 2:
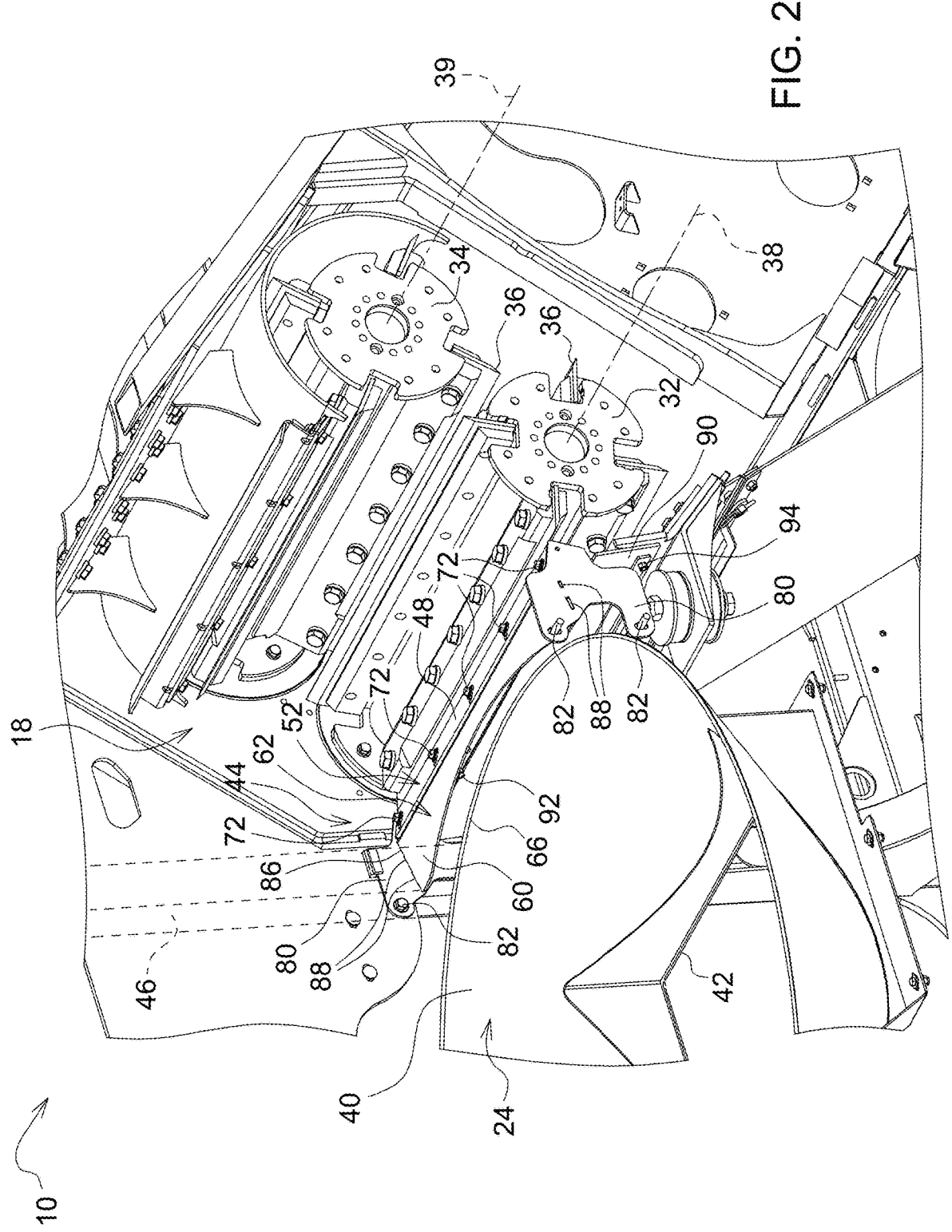
FIG. 2 is a perspective view showing a sill to guide billets discharged from the chopper toward a basket.

Referring to FIG. 2, the chopper 18 includes a lower drum 32, an upper drum 34, and knives 36 spaced about and attached to the periphery of the drums 32, 34. The drums 32, 34 counter-rotate relative to one another. The lower drum 32, is arranged to rotate about a respective axis of rotation 38. The upper drum 34 is arranged to rotate about a respective axis of rotation 39. The knives 36 of the lower drum 32 and the knives 36 of the upper drum 34 cooperate to chop stalks of sugarcane when the drums 32, 34 are counter-rotated about their respective axes 38, 39 by a chopper drive. The drums 32, 34 and the knives 36 attached thereto are driven by a chopper drive including, for example, a motor (e.g., hydraulic, electric) and gearing that transmits power from the motor shaft to one or both of the drums 32, 34.

The chopper 18 chops stalks of sugarcane into billets and outputs a stream of billets. The stream of billets is propelled or otherwise discharged from the chopper 18. The basket 24 is positioned to receive the stream of billets discharged from the chopper 18. The primary extractor 20 induces a flow of air to separate leaves from the billets during transition of the billets from the chopper 18 to the basket 24.

The basket 24 has an upper inlet 40 and a lower outlet 42. The inlet 40 receives billets into the basket 24, and the outlet 42 outputs billets to the elevator 22. The basket 24 is mounted to the elevator 22 such that the outlet 42 is positioned in register with the conveyor of the elevator 22 for the conveyor to receive billets from the basket 24. The basket 24 has a funnel-shaped portion such that the inlet 40 is larger than the outlet 42.

The harvester 10 includes a sill 44. The sill 44 is positioned between the chopper 18 and the basket 24 to guide billets discharged from the chopper 18 toward the basket 24. The sill 44 is supported by a frame 46 of the harvester (e.g., main frame) such that the sill 44 is fixed relative to the frame 46 against movement relative thereto during operation (apart from wear on the sill 44). Such a static configuration avoids costs associated with a powered roller-type of sill.

Figure 3:
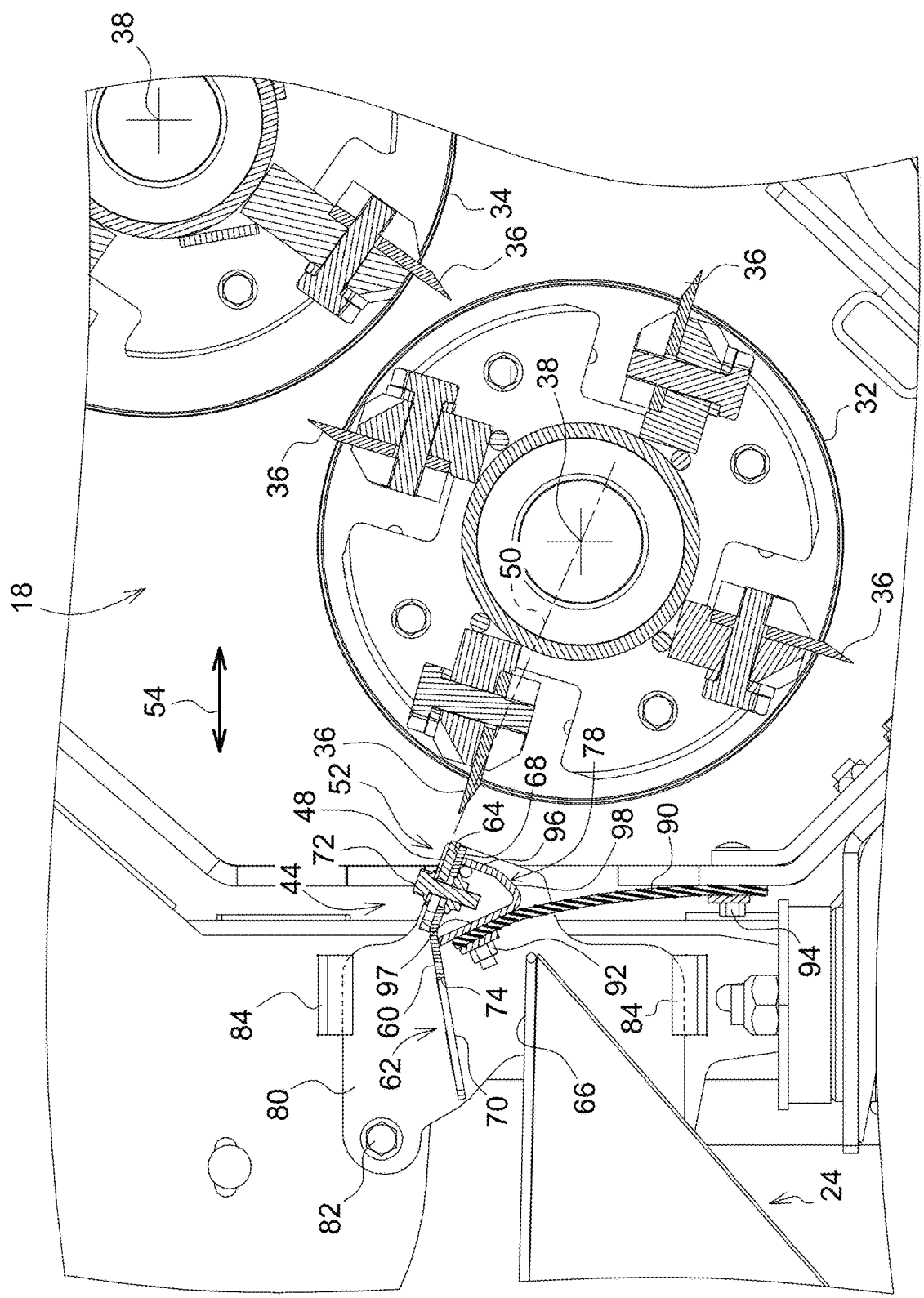
FIG. 3 is a sectional view taken along lines 3-3 of FIG. 2.
Figure 4:
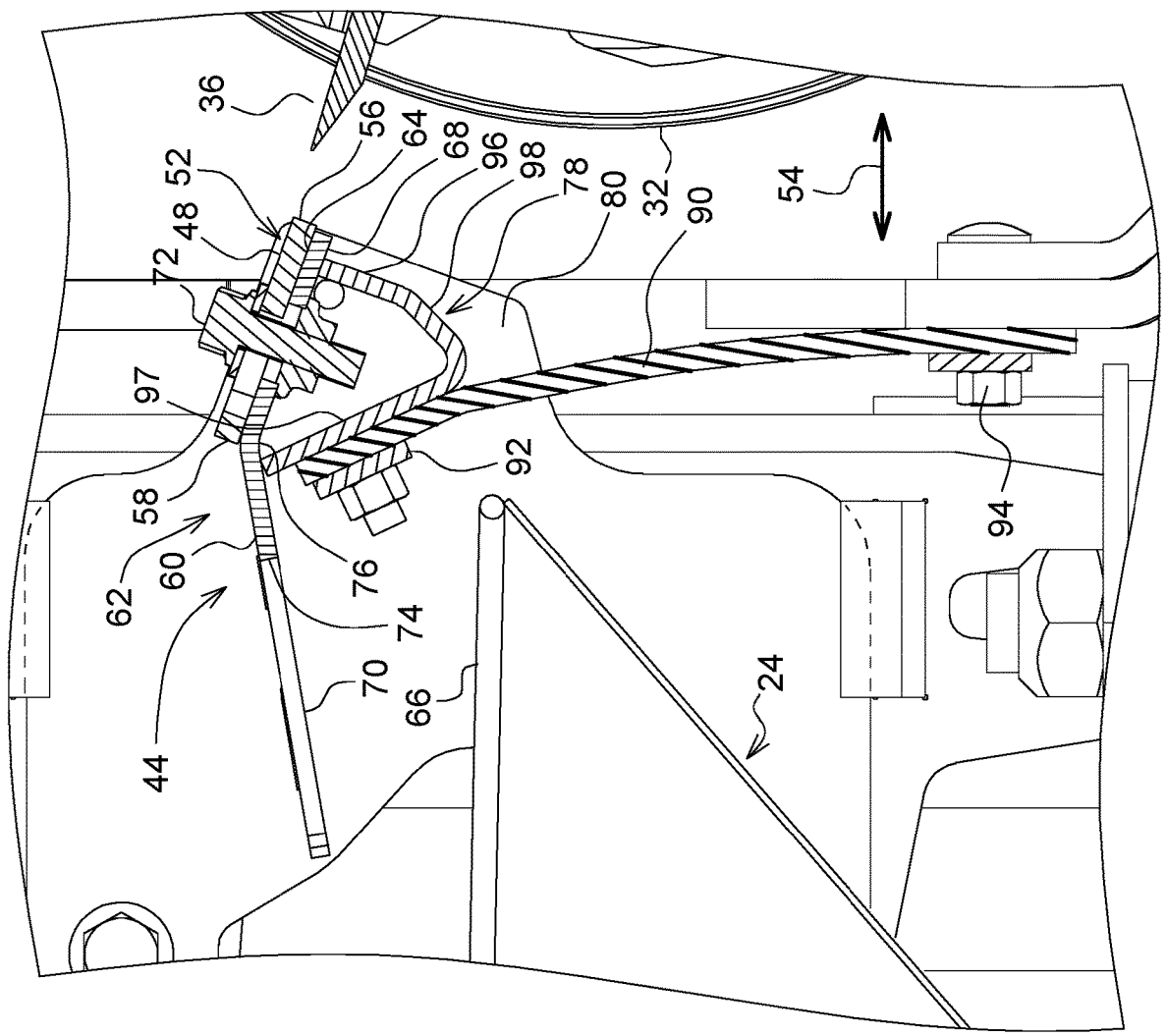
FIG. 4 is an enlarged sectional view showing the sill.

Referring to FIGS. 3-4, the sill 44 includes a first billet guide surface 48 defining an imaginary line 50 extending forwardly through or below the axis of rotation 38 of the lower drum 32. The first billet guide surface is so oriented to guide billets over the sill 44. Such an orientation makes it relatively easy for the billets to pass over the sill 44 at the release point from the chopper 18, and correspondingly reduces a risk of billets passing below the sill 44, getting blocked by the underside of the sill 44 or other structure, and reverse-fed to the chopper 18.

In the illustrated example, the billet guide surface 48 extends downwardly as the billet guide surface 48 extends forwardly, and is included in a guide plate 52 of the sill 44. The line 50 defined by the surface 48 extends forwardly and downwardly through the axis of rotation 38 of the lower drum 32. The line 50 intersects a front edge 56 of the plate 52 and a rear edge 58 of the guide plate 52.

The sill 44 includes a second billet guide surface 60 downstream from the first billet guide surface 48 to guide billets toward the basket 24. The second billet guide surface 60 extends downwardly as the second billet guide surface 60 extends rearwardly to facilitate movement of billets from the sill 44 toward the basket 24 in response to machine vibration and the force of gravity. Such facilitation of the flow of billets from the sill 44 to the basket 24 prevents or otherwise reduces accumulation of debris, dirt, and mud on the sill 44.

The sill 44 includes a sill plate 62. The guide plate 52 is configured, for example, as a wear plate fastened to the sill plate 62 on a support surface 64 of the sill plate 62. The guide plate 52 may be referred to hereinafter as the wear plate 52. The sill plate 62 includes the second billet guide surface 60.

In the illustrated example, the sill plate extends over a rim 66 of the basket 24, to facilitate movement of the billets into the basket 24. The rim 66 includes the inlet 40 of the basket 24, and is higher than the axis of rotation 38 of the lower drum 32, fostering a relatively large storage capacity of the basket 24.

The sill plate 62 includes a front wall 68 and a rear wall 70. The wear plate 52 is fastened to the front wall 68. The front wall 68 underlies the wear plate 52 such that the wear plate 52 is positioned on the support surface 64 included in the front wall 68 as the top surface thereof. The front wall 68 extends downwardly as the front wall 68 extends forwardly such that the wear plate 52 and the first billet guide surface 48 thereof extend downwardly as the wear plate 52 and the first billet guide surface 48 extend forwardly.

The wear plate 52 is removably fastened to the front wall 68 with a number of fasteners 72. Each fastener 72 includes, for example, a bolt, a nut, and a washer. Each bolt extends through the washer, the wear plate 52, and the front wall 68, with the bolt threaded to the nut attached (e.g., welded) to a lower surface of the front wall 68 and the washer positioned between the head of the bolt and the first billet guide surface 48 of the wear plate 52. Each bolt extends through a slot in the wear plate 52, the slot being elongated in the fore-aft dimension 54 to allow the wear plate 52 to be adjusted forwardly or rearwardly to increase or decrease the gap between the front edge of the wear plate 52 and the tips of the knives 36 mounted to the lower drum 32 of the chopper 18.

The rear wall 70 includes the second billet guide surface 60 and extends downwardly as the rear wall 70 extends rearwardly. Such orientation of the rear wall 70 facilitates movement of billets from the sill plate 62 toward the basket 24 in response to machine vibration and the force of gravity. Such facilitation of the flow of billets from the sill plate 62 to the basket 24 prevents or otherwise reduces accumulation of debris, dirt, and mud on the sill plate 62.

The rear wall 70 includes a rear edge 74 of the sill plate 62. At least a portion of the edge 74 is concave and extends over the basket 24.

The front and rear walls 68, 70 are joined together at a junction. For example, the sill plate 62 includes a bend 76 as the junction between the front wall 68 and the rear wall 70 such that the front and rear walls 68, 70 are angled relative to one another. The front wall 68 extends forwardly from the bend 76, and the rear wall 70 extends rearwardly from the bend 76 over the rim 66 of the basket 24. In other examples, the front and rear walls 68, 70 may be joined together at the junction in other ways (e.g., weld).

The sill 44 includes a reinforcement bracket 78 that reinforces the sill plate 62. The bracket 78 is positioned underneath the sill plate 62 such that a front edge of the bracket 78 is attached (e.g., welded) to the front wall 68 of the sill plate 62, and a rear edge of the bracket 78 is attached (e.g., welded) to the rear wall 70 of the sill plate 62. The bracket 78 includes a first wall 96 extending downwardly and rearwardly from the front wall 68, a second wall 97 extending downwardly and forwardly from the rear wall 70, and a third wall 98 extending downwardly and rearwardly from the first wall 96 to the second wall 97 at a shallower angle than the first wall 96. The bracket 78 includes a first bend between the first wall 96 and the third wall 98, and a second bend between the second wall 97 and the third wall 98.

The sill 44 may be mounted to the harvester 10 in a variety of ways. For example, the sill 44 includes two side plates 80 for use in mounting the sill 44 to the harvester 10. Rearward portions of each side plate 80 are fastened to a support panel attached to the frame 46 (e.g., welded) with fasteners 82 (e.g., two fasteners each including, for example, a bolt and nut). A forward portion of each side plate 80 is retained laterally with a lower retainer 84 and an upper retainer 84. The lower and upper retainers 84 are attached (e.g., welded) to the respective support panel. During assembly, the forward portion of each side plate 80 is slid between the respective support panel and the lower and upper retainers 84 attached to that support panel.

The sill plate 62 is positioned between and attached (e.g., welded) to the side plates 80. The rear wall 70 of the sill plate 62 has opposite side edges 86 (only left side edge 86 shown), each of which includes two positioning tabs 88, one smaller and one larger, that fit into corresponding holes in the respective side plate 80, to orient the sill plate 62 relative to the side plates 80 and the harvester 10 properly.

The harvester includes a curtain 90 to block passage of billets below the sill 44. The curtain 90 is fastened to the sill 44 and the chopper 18. The curtain 90 is fastened to the sill 44 at an upper end of the curtain 90 with a fastening arrangement 92. The fastening arrangement 92 includes a number of threaded studs, a clamp bar, and nuts. The studs are attached (e.g., welded) to a rear wall of the reinforcement bracket 78 and project rearwardly through respective apertures in the upper end of the curtain 90 and respective apertures in the clamp bar. The nuts are tightened on the studs against the clamp bar such that the upper end of the curtain 90 is clamped between the clamp bar and the rear wall of the reinforcement bracket 78 so as to attach the curtain 90 to the sill 44.

The curtain 90 is fastened to the chopper 18 at a lower end of the curtain 90 with a fastening arrangement 94. The fastening arrangement 94 includes a number of bolts, a clamp bar, and nuts. The bolts extend through respective apertures in the frame of the chopper 18, respective vertical slots in the lower end of the curtain 90, and respective apertures in the clamp bar. The nuts are tightened on the bolts against the clamp bar such that the lower end of the curtain 90 is clamped between the clamp bar and the wall of the chopper frame so as to attach the curtain 90 to the chopper 18.

Threads are not shown for ease of illustration. However, it is to be appreciated that bolts, studs, and corresponding nuts would have threads.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A sugarcane harvester for harvesting sugarcane in a forward direction of travel, comprising:
    a chopper that chops stalks of sugarcane into a plurality of billets, the chopper comprising a lower drum and an upper drum that counter-rotate relative to one another, each of the lower and upper drums arranged to do so about a respective axis of rotation,
    a basket positioned to receive a stream of the plurality of billets discharged from the chopper, and
    a sill positioned between the chopper and the basket to guide the plurality of billets discharged from the chopper toward the basket, the sill comprising a guide plate that comprises a billet guide surface oriented to guide the plurality of billets over the sill, the billet guide surface defining an imaginary line extending forwardly through or below the axis of rotation of the lower drum;
    wherein the sill comprises a sill plate, the guide plate is a wear plate fastened to the sill plate, the billet guide surface is a first billet guide surface, and the sill plate comprises a second billet guide surface; and
    wherein the sill plate comprises a front wall and a rear wall such that the front wall and the rear wall are angled relative to one another, the front wall extends downwardly as the front wall extends forwardly, the guide plate is removably fastened to the front wall which underlies the guide plate, and the rear wall comprises the second billet guide surface and extends downwardly as the rear wall extends rearwardly.

2. The sugarcane harvester of claim 1, the imaginary line extends forwardly through the axis of rotation of the lower drum.

3. The sugarcane harvester of claim 1, wherein the billet guide surface extends downwardly as the billet guide surface extends forwardly.

4. The sugarcane harvester of claim 3, wherein the billet guide surface is a first billet guide surface, and the sill comprises a second billet guide surface downstream from the first billet guide surface and extending downwardly as the second billet guide surface extends rearwardly.

5. The sugarcane harvester of claim 1, wherein the first billet guide surface extends downwardly as the first billet guide surface extends forwardly, and the second billet guide surface extends downwardly as the second billet guide surface extends rearwardly.

6. The sugarcane harvester of claim 1, wherein the sill plate comprises a bend between the front wall and the rear wall, the front wall extends forwardly from the bend, the rear wall extends rearwardly from the bend over a rim of the basket.

7. The sugarcane harvester of claim 1, wherein the sill comprises a reinforcement bracket positioned underneath the sill plate to reinforce the sill plate, the reinforcement bracket comprises a first wall extending downwardly and rearwardly from the front wall, a second wall extending downwardly and forwardly from the rear wall, and a third wall extending downwardly and rearwardly from the first wall to the second wall at a shallower angle than the first wall.

8. A sugarcane harvester for harvesting sugarcane in a forward direction of travel, comprising:
    a chopper that chops stalks of sugarcane into a plurality of billets, the chopper comprising a lower drum and an upper drum that counter-rotate relative to one another, each of the lower and upper drums arranged to do so about a respective axis of rotation,
    a basket positioned to receive a stream of the plurality of billets discharged from the chopper, and
    a sill positioned between the chopper and the basket to guide the plurality of billets discharged from the chopper toward the basket, the sill comprising a guide plate that comprises a billet guide surface oriented to guide the plurality of billets over the sill, the billet guide surface defining an imaginary line extending forwardly through or below the axis of rotation of the lower drum;
    wherein the sill comprises a sill plate, the guide plate is a wear plate fastened to the sill plate, the billet guide surface is a first billet guide surface, and the sill plate comprises a second billet guide surface; and
    wherein the sill plate extends over a rim of the basket.

9. The sugarcane harvester of claim 8, wherein the rim is higher than the axis of rotation of the lower drum.

* * * * *